(12) United States Patent
Liu et al.

(10) Patent No.: US 8,584,033 B2
(45) Date of Patent: *Nov. 12, 2013

(54) INDIVIDUALIZED TAB AUDIO CONTROLS

(75) Inventors: Kan Liu, Mountain View, CA (US);
John Nicholas Jitkoff, Palo Alto, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/246,848

(22) Filed: Sep. 27, 2011

(65) Prior Publication Data

US 2012/0023404 A1    Jan. 26, 2012

Related U.S. Application Data

(63) Continuation of application No. 12/904,135, filed on Oct. 13, 2010.

(60) Provisional application No. 61/360,176, filed on Jun. 30, 2010, provisional application No. 61/251,286, filed on Oct. 13, 2009.

(51) Int. Cl.
*G06F 15/00* (2006.01)
*G06F 13/00* (2006.01)

(52) U.S. Cl.
USPC .......................... 715/777; 715/779

(58) Field of Classification Search
USPC ................ 715/781, 765, 787, 825, 840, 767, 715/777–779
See application file for complete search history.

(56) References Cited

U.S. PATENT DOCUMENTS

| | | | |
|---|---|---|---|
| 6,697,841 B1 * | 2/2004 | Sheffield et al. | 709/206 |
| 7,022,075 B2 * | 4/2006 | Grunwald et al. | 600/446 |
| 7,366,757 B1 | 4/2008 | Ushida | |
| 7,366,767 B2 * | 4/2008 | Sheffield et al. | 709/217 |
| 7,805,286 B2 * | 9/2010 | Jorgensen et al. | 703/7 |
| 7,987,289 B2 | 7/2011 | Mason | |
| 2007/0204057 A1 | 8/2007 | Shaver et al. | |
| 2008/0194332 A1 | 8/2008 | Kadikario et al. | |

(Continued)

FOREIGN PATENT DOCUMENTS

| | | |
|---|---|---|
| WO | 2011046931 | 4/2011 |
| WO | 2011047060 A1 | 4/2011 |

OTHER PUBLICATIONS

Office Action Response and RCE for U.S. Appl. No. 12/859,249, filed Jan. 18, 2013, 3 pages.

(Continued)

*Primary Examiner* — Cao "Kevin" Nguyen
(74) *Attorney, Agent, or Firm* — Brake Hughes Bellermann LLP

(57) ABSTRACT

According to one general aspect, a method may include detecting an audio signal configured to be played from a local loudspeaker. The method may also include determining which of one or more applications is included with the audio signal, wherein the determined application includes one or more tabs. The method may include determining which tab of the one or more tabs of the determined application is included with the audio signal. The method may comprise providing a graphical user interface (GUI) included with a handle of the determined tab, wherein the graphical user interface is configured to facilitate the manipulation of the audio signal by a user. The method may include manipulating the audio signal, based upon a command generated by the graphical user interface in response to a user interaction.

20 Claims, 8 Drawing Sheets

(56) References Cited

U.S. PATENT DOCUMENTS

| | | |
|---|---|---|
| 2010/0161759 A1 | 6/2010 | Brand |
| 2010/0191783 A1 | 7/2010 | Mason |
| 2010/0211781 A1 | 8/2010 | Auradkar |
| 2010/0211782 A1 | 8/2010 | Auradkar |
| 2010/0332456 A1 | 12/2010 | Prahlad |
| 2011/0072487 A1 | 3/2011 | Hadar |
| 2011/0087603 A1 | 4/2011 | Garcia et al. |
| 2011/0087690 A1 | 4/2011 | Cairns |
| 2011/0087776 A1 | 4/2011 | Tabone et al. |
| 2011/0087960 A1 | 4/2011 | Tabone et al. |
| 2011/0088039 A1 | 4/2011 | Tabone et al. |
| 2011/0113337 A1 | 5/2011 | Liu et al. |

OTHER PUBLICATIONS

Final Office Action for U.S. Appl. No. 12/859,249, mailed Aug. 16, 2012, 21 pages.

Office Action Response for U.S. Appl. No. 12/859,249, filed Dec. 17, 2012, 9 pages.

Non-Final Office Action for U.S. Appl. No. 12/859,249, mailed Mar. 9, 2012, 14 pages.

Ateniese, et al, "Provable Data Posession at Untrusted Stores", CCS '07, Oct. 29-Nov. 2, 2007, 13 pages.

Cachin, et al, "Trusting the Cloud", IBM Research Zurich Research Laboratory 2009, 6 pages.

Curtmola, et al, "Robust Remote Data Checking", StorageSS '08, Oct. 31, 2008, 6 pages.

Itani, et al, "Privacy as a Service: Privacy-Aware Data Storage and Processing in Cloud Computing Architectures", 2009 Eighth IEEE International Conference on Dependable, Autonomic and Secure Computing, 6 pages.

Wang, et al, "Ensuring Data Storage Security in Cloud Computing", Department of ECE, Illinois Institute of Technology, 2009, 9 pages.

Office Action Response for U.S. Appl. No. 12/859,249, filed May 31, 2012, 10 pages.

Non-Final Office Action mailed for U.S. Appl. No. 12/904,135, mailed Aug. 24, 2012, 25 pages.

Search Report and Written Opinion for International Application No. PCT/US2010/05252, mailed Mar. 7, 2011, 11 pages.

Ser, "Review: Memopal Online Backup and Storage", Gear Diary, May 5, 2009, 10 pages.

Cox, et al, Pastiche: Making Backup Cheap and Easy:, Proceedings of the 5th Symposium on Operating Systems Design and Implementation, USENIX Assocation, Dec. 9-11, 2002, 15 pages.

Lee, et al., "Interactive Contents Player for Rich Media Service", IEEE Transactions on Consumer Electronics, vol. 55, No. 1, Feb. 2009, 7 pages.

Mandagere, et al, "Demystifying Data Deduplication", Middleware '09 Companion, Dec. 1-5, 2008, 6 pages.

Muthitacharoen, "A Low-Bandwidth Network File System", Proceedings of the ACM Symposium on Operating Systems Principles, Oct. 21, 2002, 14 pages.

Search Report and Written Opinion for International Application No. PCT/US2010/052320, mailed Feb. 23, 2011, 13 pages.

Wathsala, et al, "Next Generation Proxy Servers", ICACT 2008, Feb. 17-20, 2008, 4 pages.

* cited by examiner

200

Matter No.: 0058-127002
First Named Inventor: Kan Liu
INDIVIDUALIZED TAB AUDIO CONTROLS
*FIG. 3A* 300    Prior Art
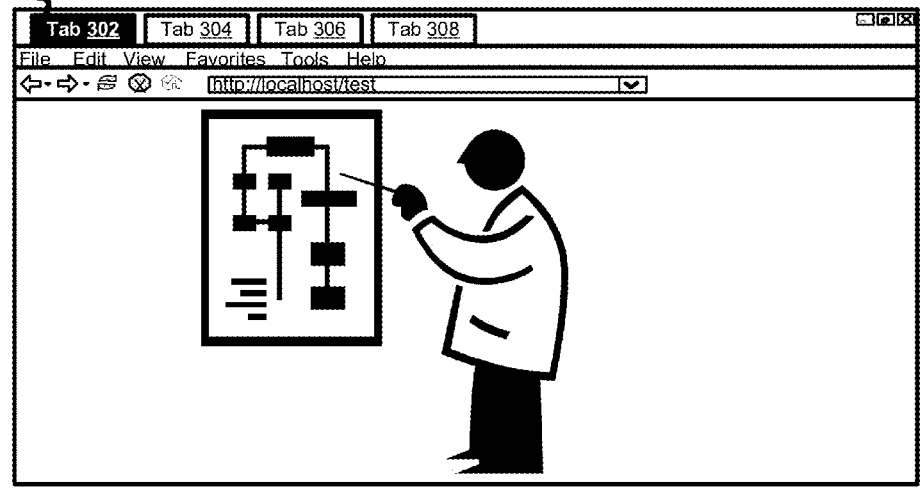
*FIG. 3B* 300    Prior Art
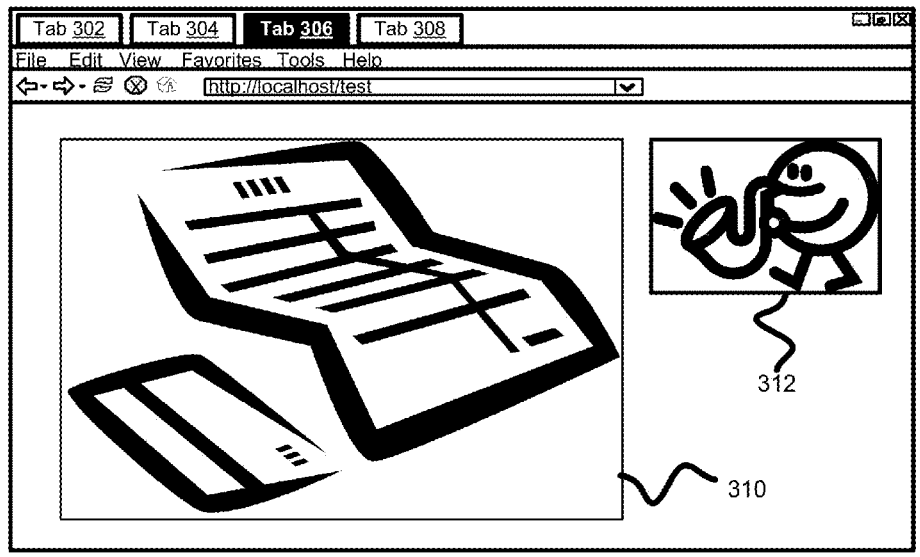

400

INDIVIDUALIZED TAB AUDIO CONTROLS

CROSS-REFERENCE TO RELATED APPLICATION

This application is a continuation of, and claims priority under 35 U.S.C. §120 to, application Ser. No. 12/904,135, filed on Oct. 13, 2010, titled "INDIVIDUALIZED TAB AUDIO CONTROLS", which claims the benefit, under 35 U.S.C. §119(e), of U.S. Provisional Application 61/251,286, filed Oct. 13, 2009, titled "POWER MANAGEMENT AND DATA CACHING IN A COMPUTING PLATFORM," and of U.S. Provisional Application Ser. No. 61/360,176, entitled "INDIVIDUALIZED TAB AUDIO CONTROLS" filed on Jun. 30, 2010. These prior applications are hereby incorporated by reference.

TECHNICAL FIELD

This description relates to multimedia, and more specifically to controlling an audio signal within an application.

BACKGROUND

Traditionally, if a computer played an audio signal there was only one point of control for that signal. A user could mute, lower or raise the volume for the computer as a whole. With the introduction of Microsoft™ Windows™ Vista™, a user could control the audio level on a per application basis.

In many applications several documents can be displayed at once in a graphical user interface (GUI). In the area of GUIs, a tabbed document interface (TDI) or multiple document interface (MDI) allows multiple documents to be contained within a single window. Often tabs can be used as containers to provide different content (e.g., documents, webpages, etc.) to a user within the a single window of an application, and to allow the user to easily switch between viewing and interacting with the different content in the different tabs. TDI's and MDI's are interface styles most commonly included with web browsers, web applications, text editors and preference panes.

Conflict may arise when more than one tab wishes to play an audio signal at the same time. For example, advertisements sometimes play jingles or other audio signals. If two or more tabs include advertisements, these advertisements may attempt to play simultaneously resulting in a cacophony of noise. Typically these unwanted sound generators (e.g., advertisements, etc.) will begin playing even if their associated tab is not in the foreground or otherwise visible to the user.

SUMMARY

According to one general aspect, a method may include detecting an audio signal configured to be played from a local loudspeaker. The method may also include determining which of one or more applications is included with the audio signal, wherein the determined application includes one or more tabs. The method may include determining which tab of the one or more tabs of the determined application is included with the audio signal. The method may comprise providing a graphical user interface (GUI) included with a handle of the determined tab, wherein the graphical user interface is configured to facilitate the manipulation of the audio signal by a user. The method may include manipulating the audio signal, based upon a command generated by the graphical user interface in response to a user interaction.

According to another general aspect, an apparatus may include a global audio manager, an audio controller, and an audio user interface (UI) generator. The global audio manager may be configured to detect an audio signal configured to be played from a local loudspeaker, and determine which of one or more applications is included with the audio signal, wherein the determined application includes one or more tabs. The audio controller may be configured to determine which tab of the one or more tabs of the determined application is included with the audio signal. The audio user interface (UI) generator configured to provide a graphical user interface (GUI) included with a handle of the determined tab, wherein the graphical user interface is configured to facilitate the manipulation of the audio signal by a user. The audio controller may further be configured to manipulate the audio signal, based upon a command generated by the graphical user interface in response to a user interaction.

According to another general aspect, a computer program product for manipulating an audio signal may include executable code that, when executed, is configured to cause an audio processing apparatus to detect an audio signal configured to be played from a local loudspeaker. The code may also cause the apparatus to determine which tab of the one or more tabs of an application is included with the audio signal. The code may also cause the apparatus to provide a graphical user interface (GUI) included with a handle of the determined tab, wherein the graphical user interface is configured to facilitate the manipulation of the audio signal by a user. The code may also cause the apparatus to manipulate the audio signal, based upon a command generated by the graphical user interface in response to a user interaction.

The details of one or more implementations are set forth in the accompanying drawings and the description below. Other features will be apparent from the description and drawings, and from the claims.

A system and/or method for controlling an audio signal, substantially as shown in and/or described in connection with at least one of the figures, as set forth more completely in the claims.

BRIEF DESCRIPTION OF THE DRAWINGS

FIGS. 3A and 3B are a schematic diagrams of an example embodiment of an application in accordance with the disclosed subject matter.

Like reference symbols in the various drawings indicate like elements.

DETAILED DESCRIPTION

Techniques are described herein in which one or more audio signals that are to be output from a local loudspeaker are detected and in which one or more applications running on a computer system are determined to be included with the audio signal(s). In addition, the application(s) that is/are determined to be included with the audio signal(s) can include a plurality of tabs, and the individual tab or tabs that is or are included with the audio signal(s) can be determined. Within a graphical user interface in which the tabs included with the audio signal(s) are displayed to a user, the audio signal(s) can be controlled through user commands issued to the application(s) included with the audio signals through the user interface in which the tabs are displayed. The method may include manipulating the audio signal, based upon a command generated by the graphical user interface in response to a user interaction.

Figure 1:
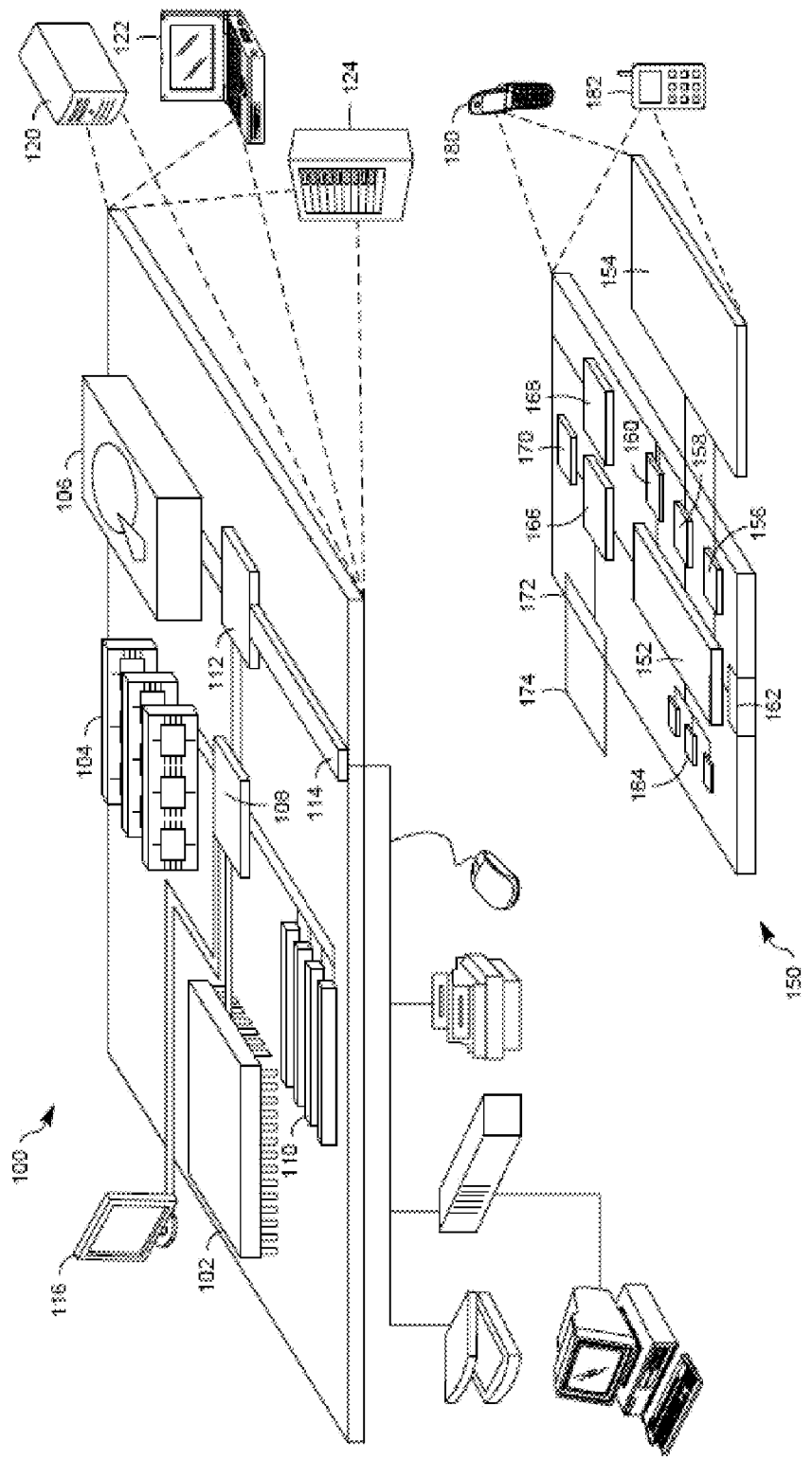
FIG. 1 is a block diagram of an example embodiment of a system in accordance with the disclosed subject matter.

FIG. 1 shows an example of a generic computer device 100 and a generic mobile computer device 150, which may be used with the techniques described here. Computing device 100 is intended to represent various forms of digital computers, such as laptops, desktops, workstations, personal digital assistants, servers, blade servers, mainframes, and other appropriate computers. Computing device 150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 100 includes a processor 102, memory 104, a storage device 106, a high-speed interface 108 connecting to memory 104 and high-speed expansion ports 110, and a low speed interface 112 connecting to low speed bus 114 and storage device 106. Each of the components 102, 104, 106, 108, 110, and 112, are interconnected using various busses, and may be mounted on a common motherboard or in other manners as appropriate. The processor 102 can process instructions for execution within the computing device 100, including instructions stored in the memory 104 or on the storage device 106 to display graphical information for a graphical user interface (GUI) on an external input/output device, such as display 116 coupled to high speed interface 108. In other implementations, multiple processors and/or multiple buses may be used, as appropriate, along with multiple memories and types of memory. Also, multiple computing devices 100 may be connected, with each device providing portions of the necessary operations (e.g., as a server bank, a group of blade servers, or a multi-processor system, etc.).

The memory 104 stores information within the computing device 100. In one implementation, the memory 104 includes a volatile memory unit or units. In another implementation, the memory 104 includes a non-volatile memory unit or units. The memory 104 may also be another form of computer-readable medium, such as a magnetic or optical disk.

The storage device 106 is capable of providing mass storage for the computing device 100. In one implementation, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 104, the storage device 106, or memory on processor 102.

The high speed controller 108 manages bandwidth-intensive operations for the computing device 100, while the low speed controller 112 manages lower bandwidth-intensive operations. Such allocation of functions is exemplary only. In one implementation, the high-speed controller 108 is coupled to memory 104, display 116 (e.g., through a graphics processor or accelerator), and to high-speed expansion ports 110, which may accept various expansion cards (not shown). In the implementation, low-speed controller 112 is coupled to storage device 106 and low-speed expansion port 114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 100 may be implemented in a number of different forms, as shown in the figure. For example, it may be implemented as a standard server 120, or multiple times in a group of such servers. It may also be implemented as part of a rack server system 124. In addition, it may be implemented in a personal computer such as a laptop computer 122. Alternatively, components from computing device 100 may be combined with other components in a mobile device (not shown), such as device 150. Each of such devices may contain one or more of computing device 100, 150, and an entire system may be made up of multiple computing devices 100, 150 communicating with each other.

Computing device 150 includes a processor 152, memory 164, an input/output (I/O) device such as a display 154, a communication interface 166, and a transceiver 168, among other components. The device 150 may also be provided with a storage device, such as a micro-drive or other device, to provide additional storage. Each of the components 150, 152, 164, 154, 166, and 168, are interconnected using various buses, and several of the components may be mounted on a common motherboard or in other manners as appropriate.

The processor 152 can execute instructions within the computing device 150, including instructions stored in the memory 164. The processor may be implemented as a chipset of chips that include separate and multiple analog and digital processors. The processor may provide, for example, for coordination of the other components of the device 150, such as control of user interfaces, applications run by device 150, and wireless communication by device 150.

Processor 152 may communicate with a user through control interface 158 and display interface 156 coupled to a display 154. The display 154 may be, for example, a TFT LCD (Thin-Film-Transistor Liquid Crystal Display) or an OLED (Organic Light Emitting Diode) display, or other appropriate display technology. The display interface 156 may comprise appropriate circuitry for driving the display 154 to present graphical and other information to a user. The control interface 158 may receive commands from a user and convert them for submission to the processor 152. In addition, an external interface 162 may be provide in communication with processor 152, so as to enable near area communication of device 150 with other devices. External interface 162 may provide, for example, for wired communication in some implementations, or for wireless communication in other implementations, and multiple interfaces may also be used.

The memory 164 stores information within the computing device 150. The memory 164 can be implemented as one or more of a computer-readable medium or media, a volatile memory unit or units, or a non-volatile memory unit or units. Expansion memory 174 may also be provided and connected to device 150 through expansion interface 172, which may include, for example, a SIMM (Single In Line Memory Module) card interface. Such expansion memory 174 may provide extra storage space for device 150, or may also store applications or other information for device 150. Specifically, expansion memory 174 may include instructions to carry out or supplement the processes described above, and may include secure information also. Thus, for example, expansion memory 174 may be provide as a security module for device 150, and may be programmed with instructions that permit secure use of device 150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 164, expansion memory 174, or memory on processor 152, that may be received, for example, over transceiver 168 or external interface 162.

Device 150 may communicate wirelessly through communication interface 166, which may include digital signal processing circuitry where necessary. Communication interface 166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 168. In addition, short-range communication may occur, such as using a Bluetooth, WiFi, or other such transceiver (not shown). In addition, GPS (Global Positioning System) receiver module 170 may provide additional navigation- and location-related wireless data to device 150, which may be used as appropriate by applications running on device 150.

Device 150 may also communicate audibly using audio codec 160, which may receive spoken information from a user and convert it to usable digital information. Audio codec 160 may likewise generate audible sound for a user, such as through a speaker, e.g., in a handset of device 150. Such sound may include sound from voice telephone calls, may include recorded sound (e.g., voice messages, music files, etc.) and may also include sound generated by applications operating on device 150.

The computing device 150 may be implemented in a number of different forms, as shown in the figure. For example, it may be implemented as a cellular telephone 180. It may also be implemented as part of a smart phone 182, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Figure 2:
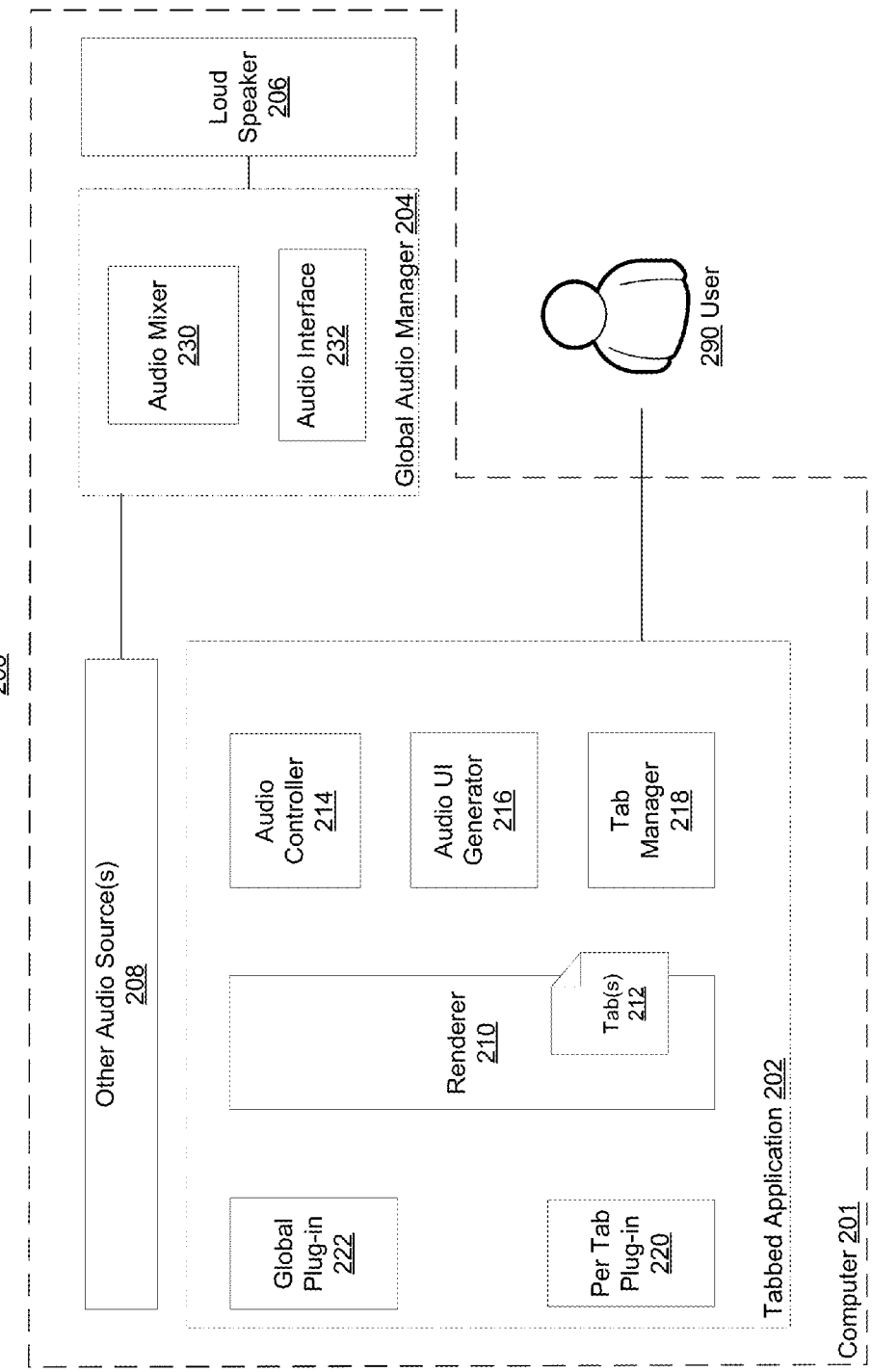
FIG. 2 is a block diagram of an example embodiment of a system in accordance with the disclosed subject matter.

FIG. 2 is a block diagram of an example embodiment of a system 200 in accordance with the disclosed subject matter. In one embodiment, the system 200 may include a computer 201, which in turn may include a tabbed application 202, a global audio manager 204, and a loudspeaker 206. In the illustrated embodiment, the tabbed application 202 may include a web browser, which may open multiple tabs of content in a window of the browser. However, it is understood that other tabbed or MDI applications may be included in various embodiments (e.g., text editors, presentation applications, media players, etc.). It is understood that the above are merely a few illustrative examples to which the disclosed subject matter is not limited.

In various embodiments, the tabbed application 202 may include a renderer 210 configured to render or cause to be displayed a document within the application 202 or a window GUI element thereof. In the illustrated embodiment, the renderer 210 may display multiple documents in a number of tabs 212. In one embodiment, the renderer 202 may be configured to work in conjunction with a tab manager 218. In such an embodiment, the tab manager 218 may be configured to manage the tabs 212 and their creation, deletion, ordering, etc. with the application 202.

In various embodiments, a document or other content rendered within a tab 212 may include an element (e.g., Hypertext Markup Language (HTML) Audio or Video tag, embedded audio file, etc.) configured to play or generate an audio signal. In such an embodiment, the audio signal may be controlled by the application's 202 audio controller 214. The audio controller 214 may be configured to pass the audio signal onto the global audio manager 204. In one specific example, the tabbed application 202 may include a web browser that may open a plurality of tabs of audiovideo content, and the audiovideo content of each respective tab may generate audio signals for playback over the loudspeaker 206.

In various embodiments, the global audio manager 204 may be configured to provide an interface between a plurality of applications (e.g., application 202, etc.) and the loudspeaker 206. In some embodiments, the global audio manager 204 may include driver software, firmware, or a combination thereof. In one embodiment, the global audio manager 204 may include an audio mixer 230 and an audio interface 232.

In one embodiment, the audio mixer 203 may be configured to receive audio signals from one or more sources, such as the application 202, its tabs 212, plug-ins 220 or 222, or other audio sources 208 included by or executing on the computer 201, etc. In various embodiments, the other audio sources 208 may include other applications, pass-through audio signals (e.g., a microphone, etc.), loopbacked signals (e.g., signals generated by one application and then re-routed to a microphone or audio-in port, etc.), or other audio sources. The audio mixer 230 may be configured to provide a level of gain or volume control to each of these audio signals and combine them into a single audio signal for consumption by the loudspeaker 206.

It is understood that while herein the term "an audio signal" is used in the singular sense, the term includes multiple channel audio signals (e.g., stereo, surround sound, 8-track, etc.). In such an embodiment, the audio mixer 230 may apply various levels of gain or volume control (including muting, etc.) to the various channels of the audio signals, and that the loudspeaker 206 may include multiple loudspeakers (e.g., right channel speaker, left channel speaker, etc.).

In one embodiment, once the audio mixer 230 has combined the various received audio signals, the resultant audio signal may be output to the audio interface 232. The audio interface 232 may be configured to provide the combined audio signal to the loudspeaker 206 for playing. The loudspeaker 206 may be configured to amplify the received combined audio signal (e.g., to a level detectable by human hearing, etc.). The loudspeaker 206 may include an electrical transducer configured to convert an electrical signal to sound or sound waves.

In various embodiments, one or more tabs 212 open in the tabbed application 202 may cause an audio signal to be generated. For example, as explained above, in a specific example, the tabbed application 202 may include a web browser that may open a plurality of tabs of audiovideo content, and the audiovideo content of each respective tab may generate audio signals for playback over the loudspeaker 206. In various embodiments, the disclosed techniques disclosed herein may be configured to provide a user 290 with a fine granularity of control of the content in the various tabs, which is responsible for the audio signal(s).

In various embodiments, the audio controller 214 may be configured to determine which tab or tabs 212 of the tabbed application 202 contain the content that causes the audio signal(s) to be generated or which respective audio signal is being generated by which tab 212. In various embodiments, this task may be performed by the global audio manager 204, in which case, the global audio manager may first determine which application (e.g., tabbed application 202 or other audio sources 208, etc.) generated the audio signal.

The determination of the tab(s) included with the audio signal(s) may be performed in various ways. For example, in the case of a tab 212 that includes an audio element (e.g., the HTML Audio or Video tags, etc.) the renderer 210 may identify the tab 212 as being a source of the audio signal. In another embodiment, the audio signal may be indirectly generated by the tab 212. In various embodiments, the audio signal may be generated by a plug-in (e.g., plug-ins 220 and 222).

In this context, a "plug-in" is generally a component that adds specific capabilities (e.g., the ability to play a certain filetype, the ability to communicate in a secure fashion, etc.) to a larger application 202. In various embodiments, a plug-in may not be capable of being executed without the assistance of the larger application 202. Generally, there are two types of plug-ins, a per tab plug-in 220 and a global plug-in 222, although it is understood that the above are merely a few illustrative examples to which the disclosed subject matter is not limited.

A per tab plug-in 220 may include a plug-in configured to be instantiated a single time per tab 212 or per element on the tab 212. For example, if the renderer 210 detects that the tab 212 includes an element included with the per tab plug-in 220, the renderer 210 may invoke or cause a version of the per tab plug-in 220 to be instantiated or executed to handle or process the associated element. If multiple tabs 212 include elements included with the plug-in 220, multiple instantiations of the plug-in 220 may occur. In such an embodiment, the audio controller 214 may easily determine if a per tab plug-in is the source or included with an audio signal.

In various embodiments, the elements included by or included with a tab 212 may include HTML tags, Extensible Markup Language (XML) elements, GUI elements (e.g., buttons, fields, panes, etc.), embedded objects (e.g., Object Linking and Embedding (OLE) objects, Component Object Model (COM) objects, etc.), etc., although it is understood that the above are merely a few illustrative examples to which the disclosed subject matter is not limited.

In the case of a global plug-in 222, the global plug-in 222 may be instantiated or executed once per computer 201. In such an embodiment, a single version of the global plug-in 222 may process or handle a number of elements or tabs 212 comprising elements included with the global plug-in 222. In various embodiments, the global plug-in 222 may handle or process elements regardless of which application (e.g., application 202 or other audio sources 208) generates or is included with the element. In such an embodiment, it may be very difficult for the audio controller 214 to determine on its own which tab 212 or application 202 or 208 is included with an audio signal.

In one embodiment, the audio controller 214 may query the global plug-in 222 to determine which application (e.g., application 202 or 208) is included with an audio signal. In another embodiment, the audio mixer 230 or global audio manager 204 may query the global plug-in 222 to determine the application or tab included with the audio signal. In such an embodiment, if the audio signal is included with an application 202 that supports fine grain audio control, the audio mixer 230 or global audio manager 204 may inform the application's 202 audio controller 214 of the results and tab's 212 association with the audio signal.

In yet another embodiment, the global plug-in 222 may proactively inform either the global audio manager 204 or the application's 202 audio controller 214 that the global plug-in 222 is generating or included with an audio signal and which tab 212 and/or element is included with that audio signal. In various embodiments, the global plug-in 222 may inform the global audio manager 204 or the application's 202 audio controller 214 of a list of commands or other operations (e.g., play, pause, mute, next track, resume, etc.) which may be performed upon the audio signal.

A number of possible message formats and messaging fields may be used or employed to communicate between the global plug-in 222 and the global audio manager 204 or audio controller 214. These messages are discussed in more detail below in reference to FIG. 7.

Once the tab(s) 212 included with an audio signal have been determined (e.g., by the audio controller 214 or the global audio manager 204), the audio user interface (UI) generator 216 may create a graphical UI (GUI) from which the user 290 may manipulate the audio signal or the audio signal's processing by the computer 201. The audio UI generator 216 may be configured to provide the GUI in the context of a handle of the tab 212, where a "tab" can be the container of all the content of the webpage and a "handle of a tab" can be a UI element that is included with the tab but displays none of the content, or less than the full content, of the tab.

A "handle of a tab" or a "tab handle" may include a GUI element configured to facilitate the selection of a tab (e.g., to bring the tab into "focus," as described in more detail in the context of FIGS. 3A and 3B), or to move the position of a tab's content within a GUI displayed to a user. For example, a tab handle may be selected through the action of a mouse and dragged to move the content included with the tab to a new location on a display screen.

Additionally, by creating the graphical UI (GUI) from which the user 290 may manipulate the audio signal or the audio signal's processing and by providing a tab handle to include the UI, the tab handle may facilitate the control of audio content within the tab. Thus, a tag handle may include GUI elements that provide information about the audio content of a tab (e.g., that indicate whether content of the tab is currently responsible for an audio signal that is being played by loudspeaker 206) and may provide selectable control elements with which a user may control audio content within the tab (e.g., that may allow a user to mute/unmute or control the volume of audio content of the tab that is or could be responsible for an audio signal played by loudspeaker 206). Thus, tag handles provide a quick way through which a user can understand which one(s) of many tabs that may be open is/are responsible for generating audio signals that are or that may be played over the loudspeaker 206, without the user having to review the content of each open tab to understand this. Furthermore, the tag handles allow the user to adjust (e.g., mute, unmute, change volume, etc.) an audio signal generated by content of a tab when many tags are open, without the user having to review the content of each open tab to make such adjustments.

While many types of tab handles may exist and are contemplated within the scope of the disclosed subject matter, three types are described in detail below, each in turn and in reference to their specific figures. A "label handle" 301 (seen in FIGS. 3 & 4) is often a small rectangular GUI element protruding from the main rectangular element of the tab itself, and generally shows the label or title (e.g., filename, HTML page title, etc.) of the tab it is included with. A label handle is analogous to and often modeled after traditional card tabs inserted in paper files or card indexes. An "expandable tab" 512 (seen in FIG. 5) may include a reduced-size GUI (e.g., reduced in size to that similar to a label handle) that represents the contents of a tab, but that hides all or the majority of the tab's contents (e.g., hiding the body element of the tab) but that can update the contents of the tab despite the hidden state of the contents. An expandable handle frequently includes an icon or other GUI element to expand the tab back to normal size by un-hiding the hidden elements. A "thumbnail handle" 606 (seen in FIG. 6) often includes a miniature picture or representation of the contents or a subset of the contents of a tab. In various embodiments, the thumbnail handle may be active or dynamic, in that the miniature picture may change as the contents of the tab change (e.g., as a video is played, etc.). Although, it is understood that the above are merely a few illustrative examples to which the disclosed subject matter is not limited.

As described above, the audio UI generator 216 may be configured to provide the GUI in a way that is included with a handle of the tab 212. In various embodiments, the audio UI generator 216 may be configured to provide a GUI included with the tab handle that facilitates or allows a user 290 to manipulate the audio signal. In such an embodiment, the tab handle GUI may generate commands, at a user's 290 request or user interaction (e.g., by selecting a button, shaking the device, etc.), that instruct the application 202 or global audio manager 204 to manipulate the audio signal. For example, a user 290 may command that the audio be muted, increased in volume, decreased in volume, paused, that the application 202 or other audio controlling component skip to the next rack within a playlist, etc., although it is understood that the above are merely a few illustrative examples to which the disclosed subject matter is not limited.

In various embodiments, the audio controller 214 may be configured to process or act upon the received audio command and manipulate the audio signal that is generated based on the contents of a tab. In some embodiments, if the command is one that may be performed by the audio mixer 230 (e.g., muting, volume control, etc.) the command may be passed, in whole or in, part or essence, to the audio mixer 230; although the audio controller 214 may process the command internally to the application 202. In another embodiment, the command may be included with a plug-in (e.g., plug-ins 220 and 222). In which case, the audio controller 214 may pass the command, in whole, part or essence, to the respective plug-in for processing. Likewise, in embodiments in which the global audio manager 204 is the controlling component, commands may be passed to the respective application's 202 audio controller 214, plug-ins 220 & 212, or handled internally by the audio mixer 230.

FIGS. 3A and 3B are diagrams of an example embodiment of an application 300 in accordance with the disclosed subject matter. In the illustrated embodiment, the application 300 may include a web browser, although it is understood that the above is merely one illustrative example to which the disclosed subject matter is not limited. In various embodiments, the application 300 may include a plurality of tabs, such as tabs 302, 304, 306, and 308, where the tabs are used as containers to provide different content to a user within the a single window of the application 300.

In one embodiment, shown in FIG. 3A, the tab 302 may be in the foreground or have focus, as illustrated by the tab's 302 label handle 301 being highlighted, such that content contained in tab 302 is displayed to a user. In the computing context, a UI element is considered to "have focus" if the operating system or computer has selected or identified that UI element as the proper element to receive user input. The content of other tabs 304, 306, 308 are not in focus and therefore the content of tabs 304, 306, 308 is not displayed, and only the label handles of tabs 304, 306, and 308 are displayed.

In FIG. 3B tab 306 is in focus, while tabs 302, 304, 308 are not in focus, and therefore the content of tabs 302, 304, 308 is not displayed. Tab 306 may contain a number of content elements or portions of a document that include various elements. A first content element 310 may not include any audio producing or generating elements, for example, documents, fill-able forms, pictures, etc., whereas a second element 312 may include an audio producing or generating content element, for example, an HTML Audio tag, an Adobe™ Flash™ animation, an MP3 audio file, an advertisement, etc.

In various embodiments, this audio element 312 may rudely begin to play the audio (generating the audio signal) automatically once the audio element 312 is loaded by the tab 306. In some embodiments, this may occur even if the tab 306 is in the background or does not have focus (e.g., if tab 302 has focus, etc.). This may be inconvenient or embarrassing for a user. Further, if the user was not aware that the tab 306 includes an audio element (e.g., an advertisement, dynamically changing element, etc.), the user may not be sure which tab 304, 306, or 308 or even which application (if multiple applications are being executed) is generating or included with the audio signal that is being played. Therefore, the user may find it difficult to quickly turn off, mute, or manipulate the audio signal.

Figure 4:
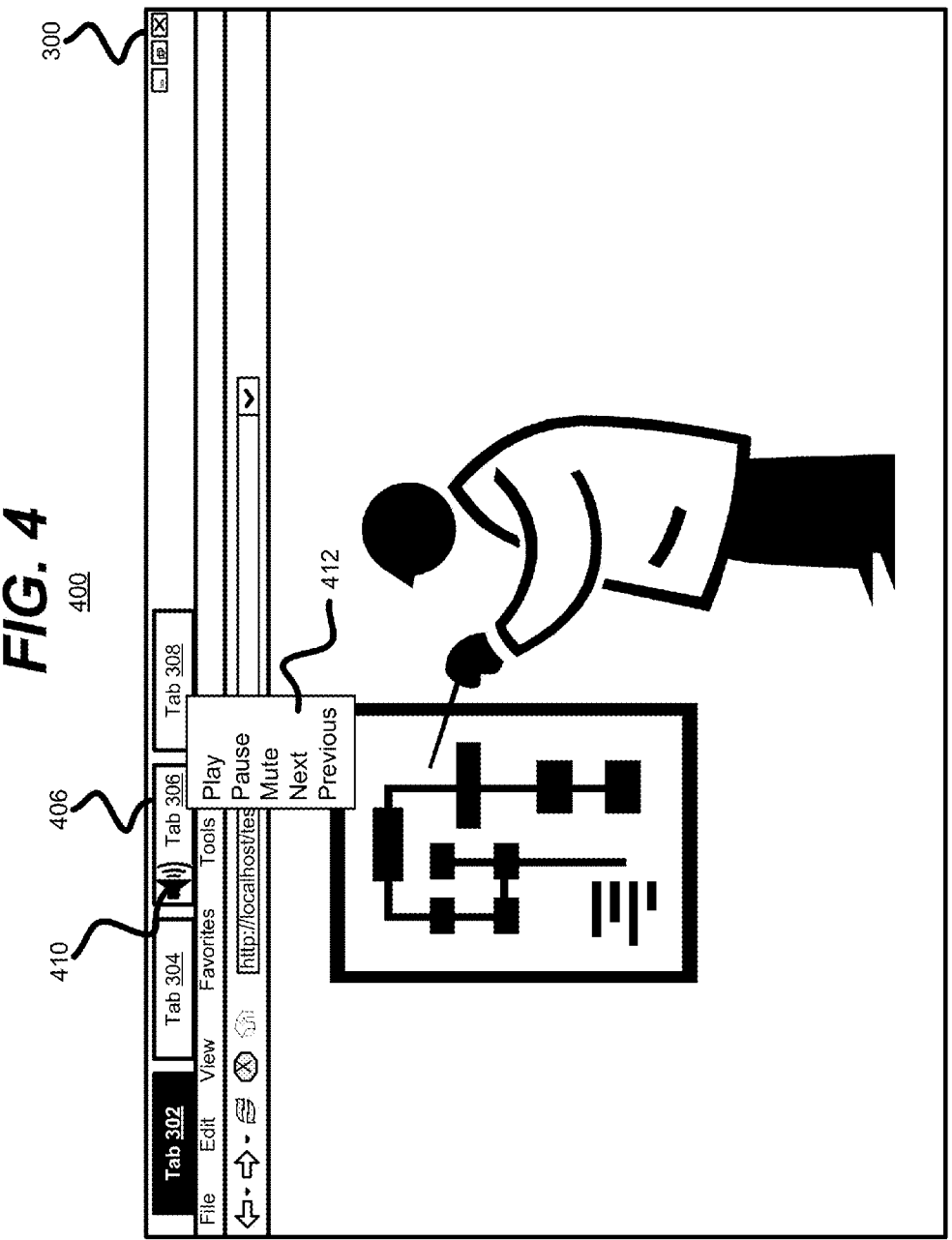
FIG. 4 is a schematic diagram of an example embodiment of a graphical user interface in accordance with the disclosed subject matter.

FIG. 4 is a diagram of an example embodiment of a graphical user interface 400 in accordance with the disclosed subject matter. In the illustrated embodiment, the application 300 of FIGS. 3A and 3B is shown with a GUI included with the label handle 406 of the tab 306, although it is understood that the illustrated is merely one illustrative example to which the disclosed subject matter is not limited.

In one embodiment, once it has been determined that the application 300 and that tab 306 are generating or are included with the audio signal (generated by element 312 of FIGS. 3A and 3B), a GUI for controlling or manipulating the audio signal may be included with the label handle 406 of tab 306. In the illustrated embodiment, the GUI may be included with tab handle 406 even if the tab 306 is not in the foreground or given focus. In the illustrated embodiment, the tab 302 is highlighted to show that its content is currently in the foreground and given focus and that tab 306 is in the background and is not given focus. In such an embodiment, the user may manipulate the audio signal generated by content of tab 306 without opening tab 406 and without causing the contents of tab 306 to be displayed or brought to the foreground.

In one embodiment, the GUI included with label handle 406 may include a badge or icon 410 configured to indicate that the tab 306 is included with an audio signal. In various embodiments, if a plurality of tabs (e.g., tabs 306 and 308) are both generating audio signals, each tab may be included with its own audio manipulation GUI and icon 410. In one embodiment, if the user selects or clicks on the icon or badge 410, the audio signal may be muted or unmated, in a toggling fashion. In such an embodiment, the icon 410 may be changed (e.g., to a picture of a speaker with a red "X" over it, etc.) to indicate the status of the audio signal. In another embodiment, a user may hover the mouse or cursor (not shown) over the icon 410 and use a scroll wheel or dynamically displayed slide-bar to control the volume level. Once again, the icon 410 may dynamically change (e.g., gaining or shedding audio wave bars) to reflect any manipulation of the audio signal. It is understood that the above are merely a few illustrative examples to which the disclosed subject matter is not limited.

In another embodiment, the GUI included with the label handle 406 may include a menu 412. In various embodiments, if a user right-clicks or otherwise selects the label handle 406 in a predetermined fashion, a menu 412 may be displayed. In some embodiments, the menu 412 may include a variety of audio manipulation commands (e.g., play, pause, mute, next, previous, etc.) that may be issued by the user to the application. In such an embodiment, the selection of the GUI included with the label handle 406 to display menu 412 may not cause the tab 306 to have focus and may not cause the content of tab 306 to be brought to the foreground. Thus, the content of tab 302 may continue to be displayed to the user while menu 412 is also displayed. The menu may or may appear in association in association with the tab 306.

In various embodiments, the audio manipulation commands may vary by the type of audio source (e.g., HTML Audio tag, HTML Video tag, a single MP3 file, a Flash™ file, etc.). In such an embodiment, a plug-in may instruct the audio UI generator which commands are supported for an audio source. For example, a plug-in or the file played by the plug-in may only support the minimizing the element or playing the element in a full screen mode (e.g., a video). In another example, a plug-in or the file played by the plug-in may support skipping or repeating tracks, attempting to buy a song, etc. In another embodiment, the commands related to volume control (e.g., muting, quieter, louder, etc.) may be universally supported and controlled by the audio controller or audio mixer, regardless of the plug-in support, while other commands are supported based upon the plug-in, as described above. It is understood that the above are merely a few illustrative examples to which the disclosed subject matter is not limited.

Figure 5:
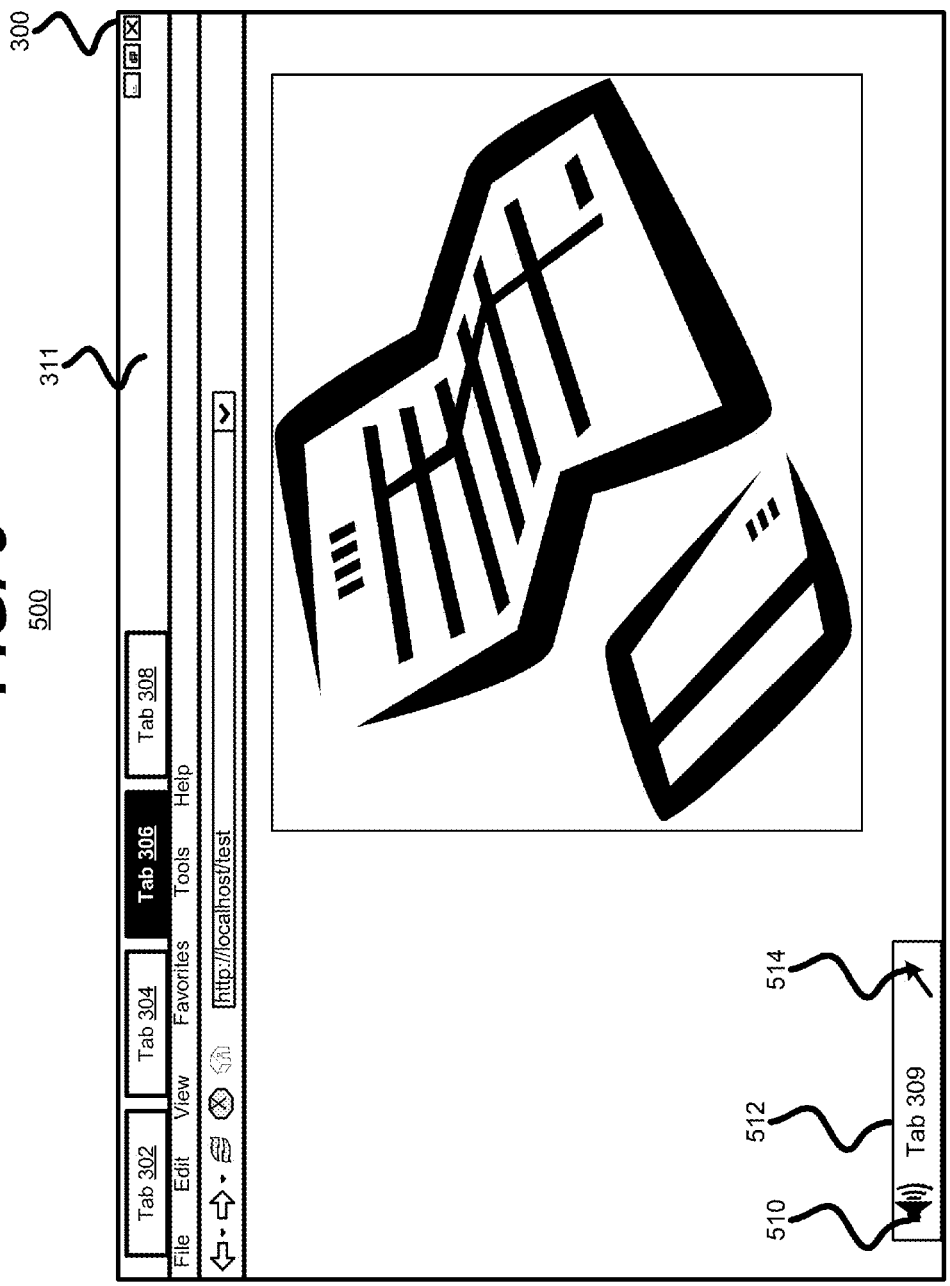
FIG. 5 is a schematic diagram of an example embodiment of a graphical user interface in accordance with the disclosed subject matter.

FIG. 5 is a diagram of an example embodiment of a graphical user interface 500 in accordance with the disclosed subject matter. In the illustrated embodiment, the application 300 of FIGS. 3A and 3B is shown with tab handles for tabs 302, 304, 306, 308 displayed in a tab bar 311. Tab 306 is in focus and its contents are displayed to the user. In addition, handle 512 is an expandable handle of a tab 309 that may have been previously opened in the application 300 and/or whose tab handle may have been previously positioned in tab bar 311. For example tab 309 may have been minimized and docked (e.g., to a task bar), either within a window included with the application 300 or outside of a window included with the application (e.g., to a task bar or a desktop). Thus, the application 300 may support shrinking or minimizing a tab, and in the process of shrinking or minimizing a tab, may convert the tab into an expandable tab. In such embodiments, the shrunken or minimized tab may be accessible or controlled via an expandable tab handle 512. In various embodiments, the expandable tab handle 512 may be accessible or visible when any tab in the tab bar 311 is in focus.

The expandable tab handle 512 may include one or more GUI elements 510 configured to allow the manipulation of an audio signal included with content of the expandable tab 309. In the illustrated embodiment, the GUI may include an indicator badge or icon 510, similar to the icon 410, as described above. In another embodiment, the GUI may include more complex icons or controls such as those of controls 618, as described below. Although, it is understood that the above are merely a few illustrative examples to which the disclosed subject matter is not limited. In various embodiments, the expandable tab handle 512 may also include a label or title that describes the contents of the tab (e.g., the audio file playing, the plug-in employed by the element, etc.).

In some embodiments, the expandable tab handle 512 may include a sizing icon or GUI element 514. In the illustrated embodiment, the sizing GUI element 514 may be used to maximize the expandable tab or return to the tab or element to its original size. Conversely, when in an expanded or maximized state, the sizing GUI element 514 may be used to minimize or shrink the expandable tab or element to its shrunken or minimized state.

In such an embodiment, an expandable tab and the expandable tab handle 512 may be employed to give quick access and control to an audio signal regardless of which tab (e.g., 302) a user has in the foreground. For example, a tab including a media player may be converted into an expandable tab, and the tab's expandable tab handle 512 may be accessed while tab 302 is in focus. Although, it is understood that the above is merely one illustrative example to which the disclosed subject matter is not limited.

Figure 6:
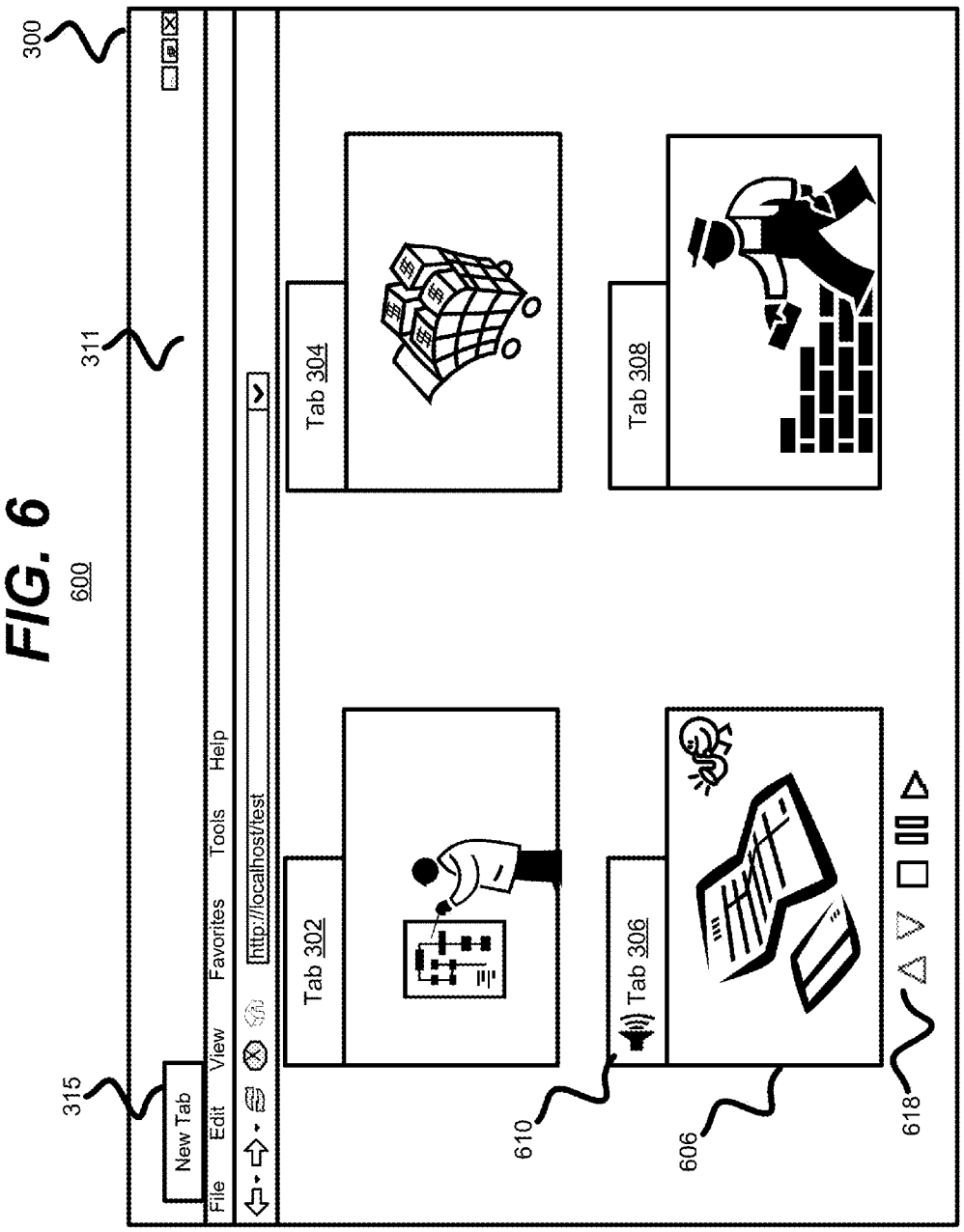
FIG. 6 is a schematic diagram of an example embodiment of a graphical user interface in accordance with the disclosed subject matter.

FIG. 6 is a diagram of an example embodiment of a graphical user interface 600 in accordance with the disclosed subject matter. Again, application 300 is shown, however, it is understood that such a UI 600 may be included a part of an operating system or windows manager (e.g., a window switcher, etc.). In various embodiments, the UI 600 may be included as part of a home screen or initial tab interface of application 300. For example, in one embodiment, when application 300 is launched, and before any tabs are opened and positioned in the tab bar 311, a generic tab handle 315 can be displayed in the tab bar, and thumbnails of tabs that were previously displayed can be shown. In another embodiment, the UI 600 may be displayed (e.g., upon user request) while one or more tabs are open in a browser, and thumbnails of the currently open tabs can be shown. It is understood that the above are merely a few illustrative examples to which the disclosed subject matter is not limited.

Thus, in one embodiment, the UI 600 may display thumbnail tab handles of the tabs 302, 304, 306 and 308, which display a representation of, or less than the full content of, tabs 302, 304, 306 and 308. These thumbnail tab handles may allow a user to select or manipulate (e.g., close, select, move, rearrange, etc.) the various tabs of the application 300 or, in another embodiment, other applications or windows.

As shown in FIG. 6, tab 306 is included with the audio signal, as described above. In various embodiments, the thumbnail tab handle 606 or the GUI included with the thumbnail handle 606 may include an icon or badge 610 configured to indicate which tab is included with the audio signal, as described above.

In various embodiments, the thumbnail tab handle 606 or the GUI included with the thumbnail handle 606 may include GUI elements 618 configured to facilitate the manipulation of the audio signal. For example the GUI elements 618 may include an icon to raise the volume of the audio signal, lower the volume of the audio signal, stop the audio signal, pause the audio signal, or resume or play the audio signal, etc. It is understood that the above are merely a few illustrative examples to which the disclosed subject matter is not limited.

Figure 7:
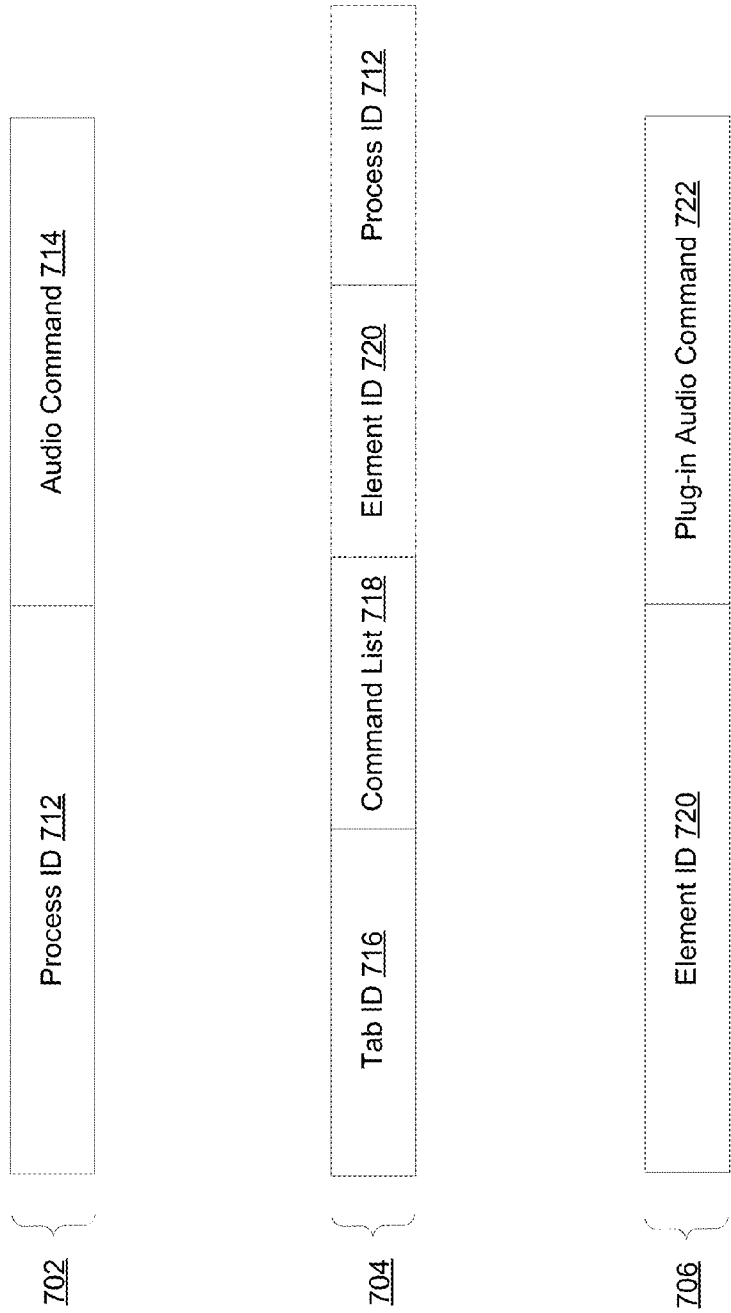
FIG. 7 is a block diagram of an example embodiment of a number of messages in accordance with the disclosed subject matter.

FIG. 7 is a block diagram of an example embodiment of a number of messages in accordance with the disclosed subject matter. As described above, the application, global audio manager, or audio driver may communicate amongst themselves and with various plug-ins.

Message 702 illustrates that, in one embodiment, an application or an audio controller thereof, may communicate with the global audio manager or driver. In various embodiments, the application may issue a command to the global audio manager to perform a relatively low-level audio command (e.g., mute an audio signal, alter the volume related to the audio signal, etc.). In one embodiment, the message may include a process identifier (ID) field 712 configured to identify which process, tab, or application the message 702 is in reference to. In various embodiments, each tab may be include or be included with a particular process. In the computing context, a "process" is an instance of a computing program that is being executed. In some embodiments, a multi-threaded application may manage a plurality of processes, for example each process included with a tab or plug-in. The message 702 may also include an audio command field 714 configured to indicate the audio command the application wishes the global audio manager or driver to perform.

Message 704 illustrates that, in one embodiment, a plug-in may communicate with an application, audio controller, global audio manager, or driver. In various embodiments, the plug-in may inform the application or driver, or portions thereof, which tab or element displayed or include by a tab is included with an audio signal. In one embodiment, this message 704 may be in response to a request to identify the tab or element. In another embodiment, the message 704 may be initiated by the plug-in when the plug-in identifies an audio signal that is the plug-in's responsibility to play.

In one embodiment, the message 704 may include a tab ID field 716 configured to identify the tab of the application that includes or is included with the audio signal. The message 704 may include a command list or field 718 that is configured to identify the audio commands supported by the audio signal or the plug-in (e.g., next track, pervious track, full screen, etc.).

The message 704 may include an element ID field 720 configured to identify the element (e.g., an HTML Embed tag, etc.) included with the audio signal; although in various embodiments this field 720 may be excluded or not included. The message 704 may also include a process ID 712 field, as described above. Although, in various embodiments, the tab ID field 716 may identify the tab via a process ID.

Message 706 illustrates that, in one embodiment, an application, audio controller, global audio manager, or driver may communicate with a plug-in. In various embodiments, the message 706 may be configured to issue or request that the plug-in perform an audio command on an audio signal under the control, at least partially, of the plug-in.

In one embodiment, the message 706 may include an element ID field 720 configured to identify the element or tab included with the audio signal such that the plug-in may identify the proper audio signal to which the message 706 applies. In various embodiments, the element ID field 720 may include a tab or process ID, as described above. The message 706 may also include a plug-in audio command field 722 configured to indicate the command the application or other wishes the plug-in to perform. Plug-in audio commands may include, but are not limited to, next track, pervious track, full screen, etc.

Figure 8:
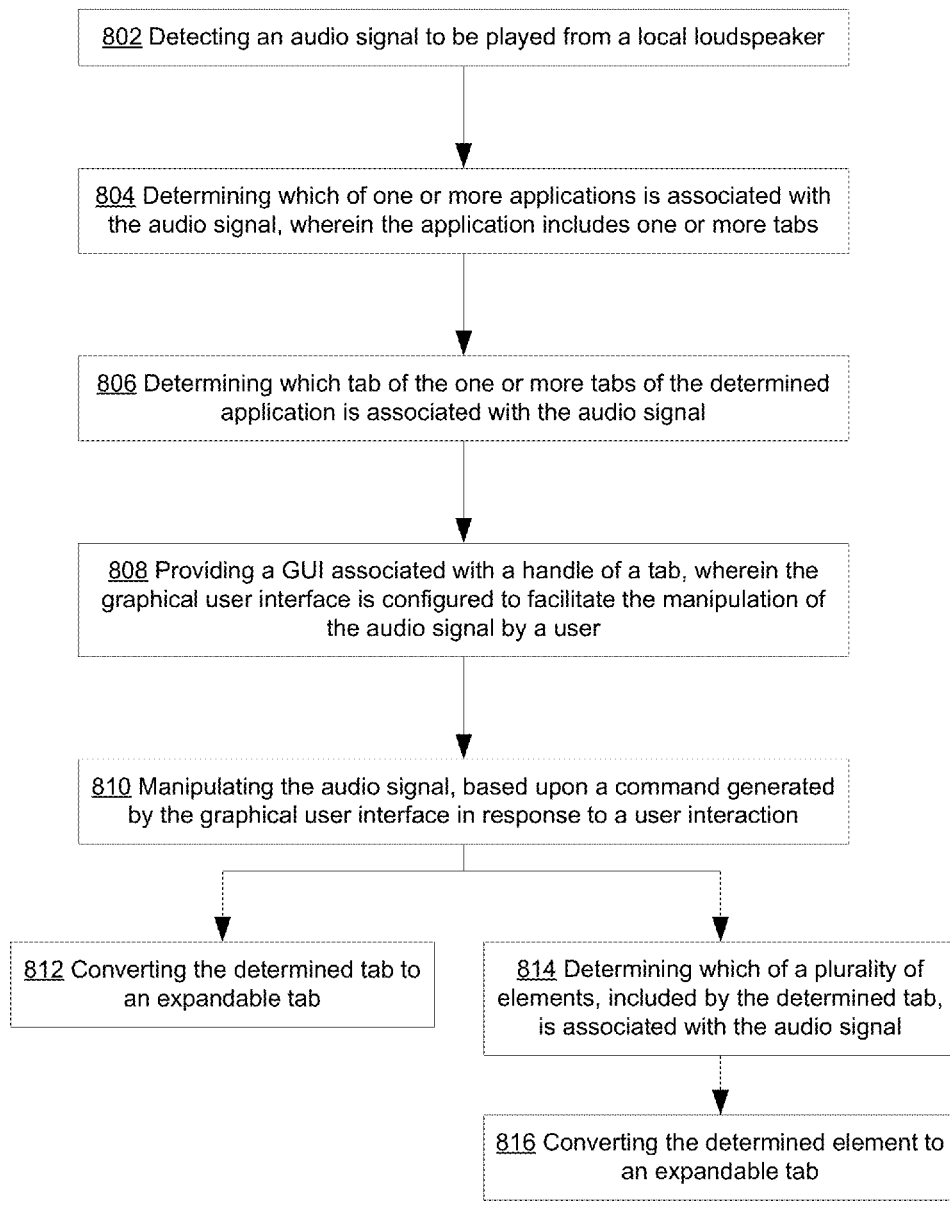
FIG. 8 is a flowchart of an example embodiment of a technique in accordance with the disclosed subject matter.

FIG. 8 is a flow chart of an example embodiment of a technique in accordance with the disclosed subject matter. In various embodiments, the technique 800 may be used or produced by the systems such as those of FIG. 1 or 2. Furthermore, portions of technique 800 may involve or include the use of graphical user interfaces such as those of FIG. 3, 4, 5, or 6, while another portion of technique 800 may include the use or production of the messages of FIG. 7. Although, it is understood that the above are merely a few illustrative examples to which the disclosed subject matter is not limited. It is understood that the disclosed subject matter is not limited to the ordering of or number of actions illustrated by technique 800.

Block 802 illustrates that, in one embodiment, an audio signal, to be played from a local loudspeaker, may be detected, as described above. In various embodiments, one or more of the action(s) illustrated by this Block may be performed by the apparatuses or systems of FIG. 1, or 2, the audio controller 214, plug-ins 220 or 222, or the global audio manager 204 of FIG. 2, as described above.

Block 804 illustrates that, in one embodiment, a determination may be made as to which of one or more applications is included with the audio signal, as described above. The associated application may include one or more tabs, as described above. In some embodiments, determining an application may include determining that a plug-in included with an application is included with the audio signal, as described above. In various embodiments, one or more of the action(s) illustrated by this Block may be performed by the apparatuses or systems of FIG. 1, or 2, the audio controller 214, plug-ins 220 or 222, or the global audio manager 204 of FIG. 2, as described above.

Block 806 illustrates that, in one embodiment, a determination may be made as to which tab of the one or more tabs of the determined application is included with the audio signal, as described above. In various embodiments, determining which tab may include determining which tab of the application is included with the plug-in, as described above. In some embodiments, where the plug-in is included with a plurality of tabs, determining which tab may include receiving an indication from the plug-in which tab is included with the audio signal, as described above. In various embodiments, one or more of the action(s) illustrated by this Block may be performed by the apparatuses or systems of FIG. 1, or 2, the audio controller 214, plug-ins 220 or 222, or the global audio manager 204 of FIG. 2, as described above.

Block 808 illustrates that, in one embodiment, a GUI included with a handle of a tab may be provided, as described above. In various embodiments, the graphical user interface may be configured to facilitate the manipulation of the audio signal by a user, as described above. In some embodiments, providing a GUI may include providing an indication on a label handle of a tab that the tab is included with the audio signal, as described above. In another embodiment, providing a GUI may include providing a GUI substantially on a thumbnail handle of a tab, as described above. In yet another embodiment, providing a GUI may include providing a GUI as part of an expandable tab handle, as described above. In various embodiments, one or more of the action(s) illustrated by this Block may be performed by the apparatuses or systems of FIG. 1, or 2, the audio UI generator 216 of FIG. 2, as described above.

Block 810 illustrates that, in one embodiment, the audio signal may be manipulated, based upon a command generated by the graphical user interface in response to a user interaction, as described above. In various embodiments, the command generated by the GUI may include a command to: decrease the volume of the audio signal, increase the volume of the audio signal, mute the volume of the audio signal, pause the audio signal, or move within a playlist included with the audio signal, etc., although it is understood that the above are merely a few illustrative examples to which the disclosed subject matter is not limited. Further, in various embodiments, manipulating may include responding to the command, as described above. In various embodiments, one or more of the action(s) illustrated by this Block may be performed by the apparatuses or systems of FIG. 1, or 2, the audio controller 214, plug-ins 220 or 222, or the global audio manager 204 of FIG. 2, as described above.

Block 812 illustrates that, in one embodiment, the determined tab may be converted to an expandable tab, as described above. In various embodiments, in which the determined tab is converted to an expandable tab, providing a GUI as described in Block 808 may include, when the expandable tab is closed, providing a GUI included with the expandable handle of the expandable tab, as described above. Further, when the expandable tab is opened, providing a GUI included with the label handle of the expandable tab, as described above. In various embodiments, one or more of the action(s) illustrated by this Block may be performed by the apparatuses or systems of FIG. 1, or 2, the audio UI generator 216 of FIG. 2, as described above.

Block 814 illustrates that, in one embodiment, a determination may be made as to which of a plurality of elements, included by the determined tab, is included with the audio signal, as described above. In various embodiments, the plurality of elements may include HTML tags, Extensible Markup Language (XML) elements, GUI elements (e.g., buttons, fields, panes, etc.), embedded objects (e.g., Object Linking and Embedding (OLE) objects, Component Object Model (COM) objects, etc.), etc., although it is understood that the above are merely a few illustrative examples to which the disclosed subject matter is not limited. In various embodiments, one or more of the action(s) illustrated by this Block may be performed by the apparatuses or systems of FIG. 1, or 2, the audio controller 214, plug-ins 220 or 222, or the global audio manager 204 of FIG. 2, as described above.

Block 816 illustrates that, in one embodiment, the determined element may be converted to an expandable tab, as described above. In various embodiments, in which the determined element is converted to an expandable tab, providing a GUI as described in Block 808 may include, when the expandable tab is closed, providing a GUI included with the expandable handle of the expandable tab, as described above. Further, when the expandable tab is opened, a GUI included with the label handle of the determined tab may be provided, as described above. In various embodiments, one or more of the action(s) illustrated by this Block may be performed by the apparatuses or systems of FIG. 1, or 2, the audio UI generator 216 of FIG. 2, as described above.

A number of embodiments have been described. Nevertheless, it will be understood that various modifications may be made without departing from the spirit and scope of the disclosed subject matter.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
    detecting, by a processor of one or more computing devices, an audio signal to be played from a local loudspeaker;
    determining, by a processor of the one or more computing devices, which tab of a plurality of tabs opened within a window web browser application is associated with the audio signal, wherein the plurality of tabs provide different content to a user of the web browser;
    providing a graphical user interface (GUI) associated with a handle of the determined tab, wherein the graphical user interface is configured to facilitate the manipulation of the audio signal by a user; and
    manipulating the audio signal, based upon a command generated based on a user's interaction with the graphical user interface.

2. The method of claim 1, wherein manipulating the audio signal includes muting the audio signal.

3. The method of claim 1, wherein providing the GUI includes providing an indication on a label handle of the determined tab that the determined tab is associated with the audio signal.

4. The method of claim 1, wherein providing the GUI includes providing a GUI associated with a thumbnail handle of a tab.

5. The method of claim 1, wherein the command generated based on a user's interaction with the graphical user interface includes a command selected from the group consisting of: decreasing the volume of the audio signal; increasing the volume of the audio signal; muting the volume of the audio signal; and pausing the audio signal.

6. The method of claim 1, wherein determining the tab includes: determining that a plug-in is associated with the application; and determining which tab of the application is associated with the plug-in.

7. The method of claim 6, wherein the plug-in is associated with a plurality of tabs, and wherein determining the tab includes receiving an indication from the plug-in as to which tab is associated with the audio signal.

8. The method of claim 1, further comprising converting the determined tab to an expandable tab; and wherein providing the GUI associated with a handle of the determined tab includes: when the expandable tab is closed, providing a GUI associated with an expandable handle of the expandable tab, and when the expandable tab is opened, providing a GUI associated with the label handle of the expandable tab.

9. The method of claim 1, further comprising: determining which of a plurality of elements, associated by the determined tab, is associated with the audio signal, and converting the determined element to an expandable tab; and wherein providing the GUI associated with a handle of the determined tab includes: when the expandable tab is closed, providing a GUI associated with the expandable handle of the expandable tab, and when the expandable tab is opened, providing a GUI associated with the label handle of the determined tab.

10. An apparatus comprising:
    a global audio manager configured to detect an audio signal configured to be played from a local loudspeaker;
    an audio controller configured to determine which tab of a plurality of tabs opened within a window web browser application is associated with the audio signal, wherein the plurality of tabs provide different content to user of the web browser; and
    an audio user interface (UI) generator configured to provide a graphical user interface (GUI) associated with a handle of the determined tab, wherein the graphical user interface is configured to facilitate the manipulation of the audio signal by a user; and
    wherein the audio controller is further configured to manipulate the audio signal, based upon a command generated based on a user's interaction with the graphical user interface.

11. The apparatus of claim 10, wherein the audio controller is configured to mute the audio signal.

12. The apparatus of claim 10, wherein the audio user interface (UI) generator is configured to provide an indication on a label handle of the determined tab that the determined tab is associated with the audio signal.

13. The apparatus of claim 10, wherein the audio user interface (UI) generator is configured to provide a GUI associated with a thumbnail handle of a tab.

14. The apparatus of claim 10, wherein the command generated based on a user's interaction with the graphical user interface includes a command selected from the group consisting of: decreasing the volume of the audio signal; increasing the volume of the audio signal; muting the volume of the audio signal; and pausing the audio signal.

15. The apparatus of claim 10, wherein the audio controller is configured to: determine that a plug-in is associated with the application; and determine which tab of the application is associated with the plug-in.

16. The apparatus of claim 15, wherein the plug-in is associated with the plurality of tabs, and wherein the audio controller is configured to receive an indication from the plug-in as to which tab is associated with the audio signal.

17. The apparatus of claim 10, further comprising an tab manager configured to convert the determined tab to an expandable tab; and wherein the audio user interface (UI) generator is configured to: when the expandable tab is closed, provide a GUI associated with an expandable handle of the expandable tab, and when the expandable tab is opened, provide a GUI associated with the label handle of the expandable tab.

18. The apparatus of claim 10, wherein the audio controller is configured to determine which of a plurality of elements, associated with the determined tab, is associated with the audio signal; further comprising an tab manager configured to convert the determined element to an expandable tab; and wherein the audio user interface (UI) generator is configured to: when the expandable tab is closed, provide a GUI associated with an expandable handle of the expandable tab, and when the expandable tab is opened, provide a GUI associated with the label handle of the determined tab.

19. A non-transitory computer-readable medium including executable code of a machine-executable program which, when executed, is configured to cause an audio processing apparatus to manipulating an audio signal by:
  detecting, by a processor of one or more computing devices, an audio signal to be played from a local loudspeaker;
  determining, by a processor of the one or more computing devices, which tab of a plurality of tabs opened within a window web browser application is associated with the audio signal, wherein the plurality of tabs provide different content to user of the web browser;
  providing a graphical user interface (GUI) associated with a handle of the determined tab, wherein the graphical user interface is configured to facilitate the manipulation of the audio signal by a user; and
  manipulating the audio signal, based upon a command generated based on a user's interaction with the graphical user interface.

20. A non-transitory computer-readable medium of claim 19, wherein the executable code, when executed, is configured to cause the audio processing apparatus to: provide the GUI by providing a GUI selected form the following group consisting of: an indication on a label handle of the determined tab, a GUI associated with a thumbnail handle of the determined tab; convert the determined tab to an expandable tab; provide a GUI associated with an expandable handle of the expandable tab.

* * * * *